United States Patent Office
3,422,138
Patented Jan. 14, 1969

3,422,138
PROCESS FOR THE MANUFACTURE OF
DETERGENT SULFONATES
Suzana Holzman, Kiryat Tivon, and Ben-Zion Milwidsky, Haifa, Israel, assignors to Dahlia Kibbutz Hashomer Hazair, Kvutzat Poalim Le'Hityashvut Shitufit Be'Eravon Mugbal, Dahlia, Israel, a corporation of Israel
No Drawing. Filed Aug. 5, 1966, Ser. No. 570,410
Claims priority, application Israel, Apr. 18, 1966, 25,559
U.S. Cl. 260—513        10 Claims
Int. Cl. C07c *143/10;* C07c *143/68*

ABSTRACT OF THE DISCLOSURE

Hydroxyalkane sulfonates for use in detergents are prepared by sulfonating an olefin with $SO_3$ in a reaction system comprising the olefin in mixture with an alcohol having a low rate of evaporation at the reaction temperature, which is about 80° C., and saponifying the resultant product.

---

This invention relates to the manufacture of sulfonates especially useful for use in detergents. More particularly the invention has as an object, the provision of detergent sulfonates which are largely biodegradable in industrial or town effluents.

It is known that aliphatic hydrocarbon sulfonates produced by the sulfonation of straight-chain olefins are readily biodegradable. It has, therefore, been suggested to make detergent sulfonates from olefins, especially from straight-chain α-olefins such as low-pressure ("Ziegler") polyethylene of low average molecular weight ($C_{14}$ to $C_{18}$), or those produced by the cracking of slack wax.

According to a known process, such olefins are sulfonated by the direct action of sulfur-trioxide-containing gas in the absence of a solvent or a sulfonating acid. According to another known process, sulfur trioxide is used in mixture with pyridine or dioxane. These solvents facilitate the sulfonation but have the disadvantage that they have to be removed from the crude sulfonation product.

For use as detergents the sulfonation products are usually converted into water-soluble salts thereof, e.g. alkali metal salts.

These known processes have some disadvantages, among which are the following:

(a) The sulfonation is not complete, its yield usually does not exceed 80%; and the unreacted olefin has to be removed from the crude sulfonate;

(b) The sulfonation product is discoloured, mostly rather darkly, and has to be bleached. It is true that the discoloration can be minimized but then the sulfonation has to be conducted in a special and complicated manner.

The present invention consists in a process for the manufacture of hydroxyalkane sulfonates, possibly in admixture with olefin sulfonates, which are suitable for detergent use, wherein as a first step an olefin, preferably a straight-chain α-olefin, and preferably of an average molecular weight in the $C_{14}$ to $C_{18}$ range, is sulfonated by means of sulfur trioxide in a reaction system containing the olefin in mixture with an alcohol, the rate of evaporation of which is low at the intended reaction temperature.

In the sulfonation product thus produced the sulfonic acid group is esterified with the alcohol present in the reaction mixture. It will ultimately have to be saponified for conversion to the desired water-soluble sulfonate. The saponification can be effected immediately as a further stage in the same manufacturing process, or else, the sulfonation product may be stored or form a commercial commodity in its own right, for subsequent saponification.

Suitable alcohols are, for example, those which do not substantially evaporate from the reaction mixture at temperatures up to about 80° C., which is a convenient reaction temperature. The alcohols may be monohydric in which case they are those having at least four carbon atoms; or polyhydric such as glycols, glycerol or the like. Some of these alcohols need not be removed from the saponified sulfonate if the presence of said alcohol in the detergent preparation neither causes the product to deteriorate in storage nor interferes with the detergent use thereof. The alcohol may even be a desirable ingredient of the detergent composition in its own right, e.g. because of an emollient effect such as in the case of glycerol. Moreover, only such alcohols should be left in the sulfonate as do not form a separate phase when the detergent preparation is dissolved in water, and which do not cause caking or sticking when the detergent is compounded into a dry preparation.

In the process according to the invention the reaction mechanism is assumed to be as follows: the sulfur trioxide adds to the double bond of the olefin and forms a sultone which reacts with the alcohol to form a hydroxy-alkane sulfonic acid ester. In the subsequent saponification the alcohol is split off and there is formed the salt of the hydroxyalkane sulfonic acid with the cation of the saponifying agent.

The final product may contain some alkene sulfonates formed in the course of the process, which do not adversely affect the desired properties of the product.

The sulfur trioxide should be used in a slight excess over the stoichiometrically required amount, in order to ensure complete sulfonation.

The hydroxyalkane sulfonic acid esters produced by the sulfonation are mostly syrupy, light-amber colored liquids, soluble in alcohol but insoluble in water. The saponified products are water-soluble. The saponification can be carried out with the aid of conventional saponifying agents, e.g. alkali metal hydroxides. For example, a concentrated aqueous sodium hydroxide solution may be used.

The alkali metal sulfonates thus produced are mostly thin pastes of light colour. By the addition of suitable builders and a subsequent drying operation, the pastes can be converted into non-hygroscopic free-flowing powders, which are completely soluble in water in the concentrations generally used for detergents and give clear solutions which produce copious foam.

The process according to the invention has advantages over the known sulfonation process mentioned above, e.g. in that the sulfonation proceeds practically to completion, that is, a negligible proportion of unreacted olefin is left in the final product, and the sulfonated products are light in color and do not require bleaching.

The process can be carried out in batches or in a continuous or semi-continuous manner. If desired, fresh olefin and sulfur trioxide may be fed into a dominant bath of already prepared sulfonated product.

The invention is illustrated by the following examples:

EXAMPLE 1

448 g. of a straight-chain α-olefin mixture of the $C_{14}$ to $C_{18}$ range, being 2 moles calculated on an average molecular weight corresponding to $C_{16}$, are mixed in a reaction vessel with 92 g. (1 mole) of dynamite-grade glycerol. Then a gas stream produced by the combustion of sulfur in air and subsequent catalytic oxidation of the $SO_2$ of the combustion gas and containing 10.6% by volume of sulfur trioxide, is introduced into the vessel while the reaction mixture is being stirred, until 176 g. (2.2 moles) of sulfur trioxide have been absorbed. During the reaction the temperature of the mixture is maintained at or below 50° C. by external cooling.

The amount of $SO_3$ used for the reaction can be dosed by a known method according to which the entire amount of $SO_3$ required for the sulfonation of a given bath of starting material is produced by the cumbustion of the calculated amount of sulfur and catalyst oxidation of the $SO_2$ in the combustion gas, due to allowance being made for the unavoidable but known amount of $SO_2$ escaping the oxidation, and for any desired excess of $SO_3$ over the amount stoichiometrically required for the sulfonation of the given batch.

Qualitative tests may be made in order to ascertain the completion of the sulfonation. One of these tests consists in adding a few drops of the reaction mixture and methyl orange to water in a test tube; the change of the neutral orange color of the indicator to red shows that the sulfonation has been completed. Another test makes use of the solubility of the reaction mixture in methanol. When a few drops of the reaction mixture are introduced into methanol in a test tube and a clear solution is produced the sulfonation has been completed.

The sulfonation product does not require bleaching, nor does it contain any appreciable amount of unreacted olefins which would otherwise have to be separated.

For saponification, 100 g. of the sulfonation product are mixed with 170 ml. of water and 30 g. of a sodium hydroxide solution of 45%-by-weight concentration, and the mixture is heated nearly to boiling for about 2 hours with continuous stirring. The water evaporating in the course of this operation is either made up or refluxed. The mixture is then testsed for completeness of the saponification by introducing a few drops into a test-tube containing 50%-by-vol. aqueous methanol. If a clear solution is formed, and remains clear for several minutes, the saponification is complete.

The sodium hydroxyalkane sulfonate thus obtained contains the liberated glycerol which need not be removed. The sulfonate-glycerol mixture can serve as a basis for conventional detergent preparations. The glycerol does not interfere with the manufacture and use of the detergent preparation and adds an emollient effect.

If the saponificaton is effected at a lower temperature, it takes longer, e.g. about 4 hours at about 70° C.

EXAMPLE 2

672 g. of a straight-chain α-olefin with an average molecular weight corresponding to $C_{16}$ (for which the aforesaid amount is equal to 3 moles) are mixed in a reaction vessel with 92 g. (1 mole) of dynamite-grade glycerol and a gas stream containing 10.6% of sulfur trioxide is introduced into the mixture which is stirred until 264 g. (3.3 moles) of sulfur trioxide have been absorbed. During the process the temperature of the reaction mixture is maintained at or below about 50° C. by external cooling. The sulfonation product is then saponified as described in Example 1.

EXAMPLE 3

72 g. of non-saponified sulfonation product prepared by the method described in Example 1 are charged into a reaction vessel together with 448 g. of a straight-chain α-olefin mixture as specified in Example 1, and 92 g. (1 mole) of dynamite-grade glycerol are added to the mixture. Then a gas stream containing 10.6% of sulfur trioxide is introduced into the vessel while the reaction mixture is stirred, until 176 g. (2.2 moles) of sulfur trioxide have been absorbed. During the reaction the temperature of the mixture is maintained at or below 50° C. by external cooling. The sulfonation product is then saponified as described in Example 1.

In this example the proportion of previously prepared sulfonation product to which fresh olefin and $SO_3$ are supplied is about 10% by weight of the total batch. Accordingly, from the completely sulfonated batch a similar proportion will be taken off and used as a bath in which the next following batch will be prepared. Of course, other proportions of the batch of ready-sulfonation product may be used.

This manner of operation, which is a semi-continuous process, has the advantage that the reactor need not be fully emptied and cleaned before a new batch is started and that the newly added olefin is at once well distributed in the reaction mixture and the feed of $SO_3$ can continue virtually without interruption.

We claim:

1. A process for the production of hydroxyalkane sulfonates suitable for detergent use, said process comprising sulfonating an olefin with sulfur trioxide in a reaction system comprising the olefin in mixture with an alcohol having a rate of evaporation which is low at the reaction temperature, said reaction temperature being up to about 80° C .to form a hydroxyalkane sulfonic acid ester and saponifying the thusly formed hydroxyalkane sulfonic acid ester to convert same to a hydroxyalkane sulfonate and the alcohol.

2. A process according to claim 1, wherein the olefin is a mixture of straight-chain α-olefins having an average molecular weight in the $C_{14}$ to $C_{18}$ range.

3. A process accordiing to claim 1, wherein the sulfur trioxide is used in a slight excess over the stoichiometrically required amount.

4. A process according to claim 1, wherein the alcohol is a monohydric alcohol having at least four carbon atoms.

5. A process according to claim 1, wherein the alcohol is a polyhydric alcohol.

6. A process according to claim 5 wherein the polyhydric alcohol is a glycol.

7. A process according to claim 6 wherein the glycol is glycerol.

8. A process according to claim 7 wherein the reaction temperature is up to about 50° C.

9. A process according to claim 1, wherein the saponification is effected with an alkali metal hydroxide.

10. A process according to claim 9 wherein the alkali metal hydroxide is sodium hydroxide.

References Cited

Helberger et al.: Chemical Abstracts 49 6083b (1955), citing Liebig's Annalen 586, 147–157 (1954).

Helberger et al.: Chemical Abstracts 50, 10129i (1956), citing German Patent 930,687, July 21, 1955.

Quaedvlieg et al.: Chem. Abs. 54, 5133d (1960) citing German Patent 1,021,359, Dec. 27, 1957.

DANIEL D. HOROWITZ, *Primary Examiner.*

U.S. Cl. X.R.

260—456